(12) United States Patent
Tang (10) Patent No.: US 11,246,077 B2
(45) Date of Patent: Feb. 8, 2022

(54) CELL RESELECTION METHOD, APPARATUS, AND SYSTEM

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/901,106

(22) Filed: Jun. 15, 2020

(65) Prior Publication Data

US 2020/0314720 A1 Oct. 1, 2020

Related U.S. Application Data

(63) Continuation of application No. PCT/CN2018/073425, filed on Jan. 19, 2018.

(51) Int. Cl.
*H04W 4/00* (2018.01)
*H04W 36/30* (2009.01)
*H04W 36/00* (2009.01)
*H04W 36/08* (2009.01)

(52) U.S. Cl.
CPC ....... *H04W 36/30* (2013.01); *H04W 36/0061* (2013.01); *H04W 36/08* (2013.01)

(58) Field of Classification Search
CPC .. H04W 36/30; H04W 36/0061; H04W 36/08
See application file for complete search history.

(56) References Cited

U.S. PATENT DOCUMENTS

| 2006/0166694 | A1* | 7/2006 | Jeong | H04W 48/16 455/525 |
| 2012/0202481 | A1 | 8/2012 | Martin | |
| 2012/0208535 | A1 | 8/2012 | Martin | |
| 2012/0315913 | A1* | 12/2012 | Yang | H04W 48/16 455/438 |

(Continued)

FOREIGN PATENT DOCUMENTS

| CN | 101087472 A | 12/2007 |
| CN | 101132614 A | 2/2008 |

(Continued)

OTHER PUBLICATIONS

International Search Report in the international application No. PCT/CN2018/073425, dated Oct. 11, 2018.

(Continued)

*Primary Examiner* — Siren Wei
(74) *Attorney, Agent, or Firm* — Perkins Coie LLP (57) ABSTRACT

A cell reselection method and apparatus are provided. In the method, system information of a serving cell is received by a terminal; configuration information of a neighboring cell from the system information is obtained by the terminal, where the configuration information includes information related to cell reselection; and the cell reselection is performed by the terminal according to the configuration information of the neighboring cell, signal quality of the serving cell, and signal quality of the neighboring cell.

16 Claims, 3 Drawing Sheets

(56) References Cited

U.S. PATENT DOCUMENTS

| | | | | |
|---|---|---|---|---|
| 2015/0092768 A1* | 4/2015 | Ng | ................ | H04W 48/16 |
| | | | | 370/350 |
| 2015/0341833 A1 | 11/2015 | Palanisamy et al. | | |
| 2017/0150410 A1 | 5/2017 | Yang et al. | | |
| 2018/0139036 A1* | 5/2018 | Islam | ................ | H04L 5/0048 |
| 2018/0198585 A1* | 7/2018 | Lin | ................ | H04B 7/024 |
| 2018/0324022 A1* | 11/2018 | Sheng | ................ | H04L 5/0082 |
| 2019/0387550 A1* | 12/2019 | Pan | ................ | H04L 5/0094 |

FOREIGN PATENT DOCUMENTS

| | | |
|---|---|---|
| CN | 101932048 A | 12/2010 |
| CN | 102740389 A | 10/2012 |
| CN | 103404198 A | 11/2013 |
| CN | 106612526 A | 5/2017 |
| CN | 106658613 A | 5/2017 |
| CN | 106664619 A | 5/2017 |
| CN | 106879009 A | 6/2017 |
| CN | 106979009 A | 7/2017 |
| KR | 20160021702 A | 2/2016 |
| RU | 2525226 C2 | 8/2014 |

OTHER PUBLICATIONS

"3rd Generation Partnership Project; Technical Specification Group Radio Access Network; Evolved Universal Terrestrial Radio Access (E-UTRA); User Equipment (UE) procedures in idle mode(Release 14)", 3GPP TS 36.304 V14.3.0 (Jun. 2017), http://www.3gpp.org.
Written Opinion of the International Search Authority in the international application No. PCT/CN2018/073425, dated Oct. 11, 2018.
Huawei et al: "Detailed design of the contents of System Information" 3GPP Draft; R2-1713284, 3rd Generation Partnership Project (3GPP), Mobile Competence Centre; 650, Route Des Lucioles; F-06921 Sophia-Antipolis Cedex; France, vol. Ran WG2, No. Reno, USA; Nov. 27, 2017-Dec. 1, 2017,Nov. 17, 2017 (Nov. 17, 2017), XP051372046, Retrieved from the Internet: URL: http://www.3gpp.org/ftp/tsg%5Fran/WG2%5FRL2/TSGR2%5F100/Docs/[ retrieved on Nov. 17, 2017]* pp. 4-7 *.
OPPO: "Initial Consideration on Other SI for NR", 3GPP Draft; R2-1800057 Initial Consideration on Other SI for NR, 3rd Generation Partnership Project (3GPP), Mobile Competence Centre ; 650, Route Des Lucioles; F-06921 Sophia-Antipolis Cedex; France, vol. Ran WG2, No. Vancouver, Canada; Jan. 22, 2018-Jan. 26, 2018, Jan. 12, 2018 (Jan. 12, 2018), XP051385982, URL: http://www.3gpp. org/ftp/tsg%5Fran/WG2%5FRL2/TSGR2%5FAHs/2018%5F01%5FNR/Docs/[ retrieved on Jan. 12, 2018]*p. 1*.
Supplementary European Search Report in the European application No. 18900769.3, dated Oct. 19, 2020.
"LTE; Evolved Universal Terrestrial Radio Access (E-UTRA); User Equipment (UE) procedures in idle mode (3GPP TS 36.304 version 13.8.0 Release 13)", vol. 3GPP RAN, No. V13.8.0, Jan. 17, 2018, XP014311486.
First Office Action of the Russian application No. 2020124436, dated Feb. 18, 2021.
First Office Action of the European application No. 18900769.3, dated Mar. 31, 2021.
3GPP TSG-RAN WG2#100 R2-1712229 (Revision of R2-1710180), Reno, USA, Nov. 27-Dec. 1, 2017, Agenda Item: 10.4.1.6.2; Source: OPPO; Title: Initial Consideration on Content of Other SI for NR.
Notice of Allowance of the Russian application No. 2020124436, dated May 28, 2021.
3GPP TS 36.331 V13.2.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 13).
First Office Action of the Chinese application No. 202010423372.0, dated Jun. 3, 2021.
Second Office Action of the Chinese application No. 202010423372.0, dated Aug. 16, 2021.
First Office Action of the Canadian application No. 3088810, dated Aug. 24, 2021. 5 pages.
Office Action of the Indian application No. 202027034910, dated Aug. 27, 2021. 5 pages with English translation.
Notice of Allowance of the Chinese application No. 202010423372.0, dated Oct. 18, 2021. 5 pages with English translation.
Huawei, HiSilicon, Neul Ltd, "System Information Contents", 3GPP TSG-RAN WG2 Meeting #93 R2-161457, St. Julian's, Malta, Feb. 15-19, 2016. 4 pages.
First Office Action of the Korean application No. 10-2020-7020233, dated Dec. 15, 2021. 11 pages with English translation.

* cited by examiner

CELL RESELECTION METHOD, APPARATUS, AND SYSTEM

CROSS-REFERENCE TO RELATED APPLICATION

This is a continuation application of International Patent Application No. PCT/CN2018/073425, filed on Jan. 19, 2018, the contents of which are hereby incorporated by reference in its entirety.

BACKGROUND

When accessing a cell, a terminal in an idle state usually needs to perform processes such as public land mobile network (PLMN) selection, cell selection/cell reselection, and location registration. The cell selection/cell reselection process may enable the terminal to camp on a suitable cell.

In a cell reselection process in related technologies, the terminal needs to read a system information block (system information block) 1 of a neighboring cell, obtain configuration information of the neighboring cell from the SIB1 of the neighboring cell, and determine whether the neighboring cell is a suitable cell according to the configuration information of the neighboring cell; and when the neighboring cell is a suitable cell, cell reselection is performed with reference to cell signal quality of a serving cell and cell signal quality of the neighboring cell.

SUMMARY

Embodiments of this application relate to the communications field, and in particular, to a cell reselection method, apparatus, and system.

According to a first aspect of this application, a cell reselection method is provided. The method includes:

receiving, by a terminal, system information of a serving cell;

obtaining, by the terminal, configuration information of a neighboring cell from the system information, where the configuration information includes information related to cell reselection; and performing, by the terminal, cell reselection according to the configuration information of the neighboring cell, signal quality of the serving cell, and signal quality of the neighboring cell.

According to a second aspect of this application, a system information method is provided. The method includes:

obtaining, by an access network device, configuration information of a neighboring cell of a serving cell, where the configuration information includes information related to cell reselection;

generating, by the access network device, system information of the serving cell, where the system information carries the configuration information of the neighboring cell; and sending, by the access network device, the system information of the serving cell to a terminal, where the terminal is a terminal camping on the serving cell, and the configuration information is used by the terminal for cell reselection.

According to a third aspect of this application, a cell reselection apparatus is provided. The apparatus includes:

a receiving module, configured to receive system information of a serving cell; and a processing module, configured to obtain configuration information of a neighboring cell from the system information, where the configuration information includes information related to cell reselection, where the processing module is configured to perform the cell reselection according to the configuration information of the neighboring cell, signal quality of the serving cell, and signal quality of the neighboring cell.

According to a fourth aspect of this application, a system information sending apparatus is provided. The apparatus includes:

a processing module, configured to obtain configuration information of a neighboring cell of a serving cell, where the configuration information includes information related to cell reselection, where the processing module is configured to generate system information of the serving cell, and the system information carries the configuration information of the neighboring cell; and a sending module, configured to send the system information of the serving cell to a terminal, where the terminal is a terminal camping on the serving cell, and the configuration information is used by the terminal for cell reselection.

According to a fifth aspect of this application, a terminal is provided. The terminal includes a processor and a memory. The memory stores at least one instruction, and the at least one instruction is configured to be executed by the processor to implement the cell reselection method according to the forgoing first aspect.

According to a sixth aspect of this application, an access network device is provided. The access network device includes a processor and a memory. The memory stores at least one instruction, and the at least one instruction is configured to be executed by the processor to implement the system information sending method according to the forgoing second aspect.

According to a seventh aspect of this application, a computer readable storage medium is provided. The storage medium stores at least one instruction, and the at least one instruction is configured to be executed by a processor to implement the cell reselection method according to the forgoing first aspect.

According to an eighth aspect of this application, a computer readable storage medium is provided. The storage medium stores at least one instruction, and the at least one instruction is configured to be executed by a processor to implement the system information sending method according to the forgoing second aspect.

According to a ninth aspect, a communications system is provided. The system includes: a terminal and an access network device.

The terminal includes the apparatus according to the third aspect. The access network device includes the apparatus according to the fourth aspect. Alternatively, the terminal is the terminal according to the fifth aspect, and the access network device is the access net

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DETAILED DESCRIPTION

To make the objectives, technical solutions, and advantages of this application clearer, the following further describes the implementations of this application in detail with reference to the accompanying drawings.

A "module" mentioned in this specification usually is a program or an instruction that is stored in a memory and can implement some functions. A "unit" mentioned in this specification is a functional structure divided based on logic. The "unit" may be implemented by only hardware, or implemented by a combination of software and hardware.

In this specification, the term "a plurality of" means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In the specification and claims of this application, the terms "first", "second", and the like are not intended to indicate any order, quantity, or significance, but are intended to distinguish between different components.

Figure 1:
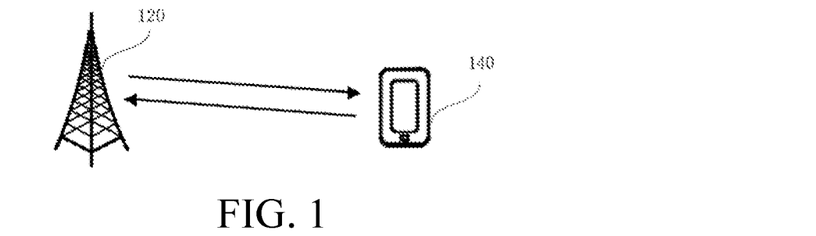
FIG. 1 is a schematic structural diagram of a mobile communications system according to a schematic embodiment of this application.

FIG. 1 is a schematic structural diagram of a mobile communications system according to an embodiment of this application. The mobile communications system may be a 5G system, also referred to as an NR system. The mobile communications system includes: an access network device 120 and a terminal 140.

The access network device 120 may be a base station. For example, the base station may be a base station (gNB) using a centralized distributed architecture in the 5G system. When using a centralized distributed architecture, the access network device 120 usually includes a central unit (CU) and at least two distributed units (DU). The central unit is provided with protocol stacks of a packet data convergence protocol (PDCP) layer, a radio link control (RLC) layer, and a media access control (MAC) layer. The distributed units are each provided with a protocol stack of a physical (PHY) layer. A specific implementation of the access network device 120 is not limited in this embodiment of this application. Optionally, the access network device may further include a home eNB (HeNB), a relay, and a picocell base station Pico, and the like. The access network device 120 may also be referred to as a network side device. A general network side device further includes a core network device (not shown in the drawings) located at an upper layer of the access network device 120.

The access network device 120 establishes a wireless connection with the terminal 140 through a wireless air interface. Optionally, the wireless air interface is a wireless air interface based on the fifth generation mobile communications network technology (5G) standard. For example, the wireless air interface is a new air interface; alternatively, the wireless air interface may also be a wireless air interface based on the next generation mobile communications network technology standard of 5G.

The terminal 140 may be referred to as a device providing voice and/or data connectivity for a user. The terminal may communicate with one or more core networks by using a radio access network (RAN). The terminal 140 may be a mobile terminal, such as a mobile phone (or referred to as a "cellular" phone) or a computer having a mobile terminal.

It should be noted that the mobile communications system shown in FIG. 1 may include a plurality of access network devices 120 and/or a plurality of terminals 140. FIG. 1 shows an example in which one access network device 120 and one terminal 140 for description. However, this is not limited in this embodiment.

Optionally, an application scenario of the 5G system includes but is not limited to: enhanced mobile broadband (eMBB), ultra reliable&low latency communication (URLLC), and massive machine type communication (mMTC).

The eMBB aims at enabling a user to obtain multimedia content, services, and data, and demand for the eMBB grows rapidly. In addition, because the eMBB may be deployed in different scenarios, for example, deployed indoors, in downtown, or in rural areas, the capacity and requirement thereof also differ significantly. Typical applications of the URLLC include: industrial automation, power automation, a remote surgery operation (surgery), transportation safety guarantee, and the like. Features of the mMTC include: a high connection density, a small data volume, delay-insensitive services, low costs of modules, a long life span, and the like.

In early deployment of the 5G system, it is difficult to implement integrated 5G system coverage. Therefore, typical network coverage is wide-area coverage of a Long Term Evolution (LTE) system and an island coverage mode of the NR system. In addition, numerous LTE systems are deployed at frequency bands lower than 6 GHz, and only few spectrums lower than 6 GHz can be used in 5G. Therefore, for the NR system, the application of spectrums higher than 6 GHz needs to be studied. However, in high frequency bands, coverage is limited and signals fade quickly. Meanwhile, to protect early LTE investment of mobile operators, a tight interworking operating mode between the LTE system and the NR system is put forward.

First, several terms in this application are briefly described:

Synchronization signal block/physical broadcast channel block (SS/PBCH block, SSB): an SSB includes a primary synchronization signal (PSS), a secondary synchronization signal (SSS), and a physical broadcast channel (PBCH). Typically, the SSB occupies 4 symbols in a time domain, and occupies a total of 240 subcarriers in a frequency domain. Definitely, the SSB may alternatively occupy a resource in a time domain and/or a frequency domain in another manner, and this is not limited in this embodiment.

Wideband carrier: a carrier on a relatively wide broadband.

Serving cell: a defined cell on which the terminal camps currently.

Physical cell identifier (PCI): used for distinguishing radio signals of different cells. Typically, the mobile communications system provides 504 PCIs.

E-UTRAN cell global identifier (ECGI): including a PLMN and a cell identity, and is used for globally identifying a cell in the PLMN.

System information (SI) refers to information that is repeatedly broadcasted by an access network device to a terminal, and is used for indicating that the terminal can normally work with the access network device in a cell. Optionally, an SIB includes minimum system information (minimum SI) and other system information (other SI). The minimum system information includes related parameters when the terminal accesses the cell, and further includes scheduling information of the other system information. Generally, a minimum system information block is transmitted on a downlink control channel, and the other system information is transmitted on a downlink shared channel.

SIB: each SIB is used for transmitting cell configuration information of a certain type. Typically, more than ten system information blocks are defined in one cell.

Figure 2:
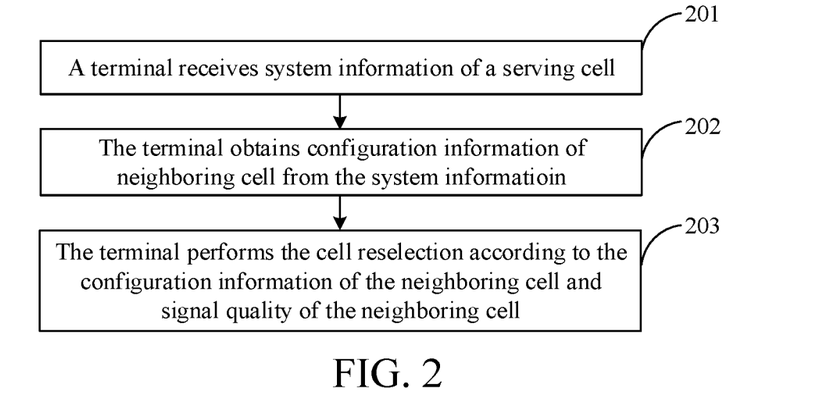
FIG. 2 is a flowchart of a cell reselection method according to a schematic embodiment of this application.

FIG. 2 is a flowchart of a cell reselection method according to an exemplary embodiment of this application. This embodiment is described by using an example in which the cell reselection method is applied to the terminal shown in FIG. 1. The method includes:

Operation 201: The terminal receives system information of a serving cell.

The serving cell is a cell on which the terminal camps currently. The terminal receives the system information of the serving cell on which the terminal camps currently.

Operation 202: The terminal obtains configuration information of a neighboring cell from the system information.

The system information of the serving cell includes a plurality of system information blocks. Some of the system information blocks carry the configuration information of the neighboring cell. The terminal obtains the configuration information of the neighboring cell from the system information of the serving cell. The configuration information includes information related to cell reselection.

Optionally, the configuration information of the neighboring cell includes at least one of the following information:

SSB configuration information of a wideband carrier on which the neighboring cell is located; optionally, the SSB configuration information includes at least one of a frequency location, a PCI, and an ECGI;

a public land mobile network list;

a tracking area (TA);

a maximum uplink transmit power that is allowed; and a cell bar access status indication.

Operation 203: The terminal performs cell reselection according to the configuration information of the neighboring cell, signal quality of the serving cell, and signal quality of the neighboring cell.

In conclusion, in the method provided in this embodiment, a terminal directly obtains configuration information of a neighboring cell based on system information of a serving cell on which the terminal camps, and performs cell reselection according to the configuration information of the neighboring cell. The terminal may directly obtain the configuration information of the neighboring cell from the system information of the serving cell without listening to system information of the neighboring cell, or the terminal listens to less system information of the neighboring cell, thereby saving computing resources and power consumption of the terminal.

It should be noted that the configuration information includes information related to cell reselection, which may be interpreted as including all or some of the information related to cell reselection, instead of being merely narrowly interpreted as all the information related to cell reselection.

Figure 3:
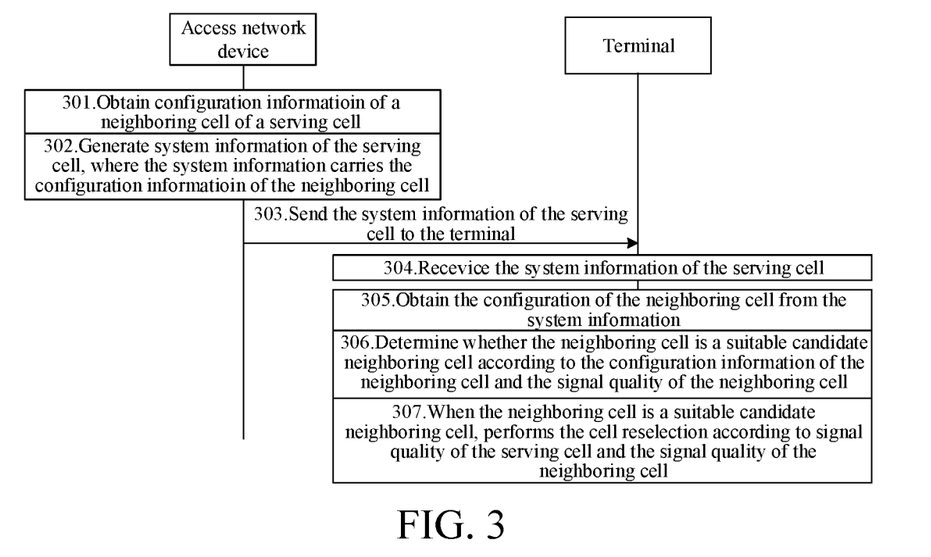
FIG. 3 is a flowchart of a cell reselection method according to another schematic embodiment of this application.

FIG. 3 is a flowchart of a cell reselection method according to an exemplary embodiment of this application. This embodiment is described by using an example in which the cell reselection method is applied to the terminal shown in FIG. 1. The method includes:

Operation 301: An access network device obtains configuration information of a neighboring cell of a serving cell.

The serving cell is a cell on which the terminal camps currently.

Optionally, the access network device obtains the configuration information of the neighboring cell from a core network device; and/or, the access network device obtains the configuration information of the neighboring cell from another access network device. The configuration information includes information related to cell reselection.

Optionally, the configuration information of the neighboring cell includes at least one of the following information: all or some SSB configuration information of a wideband carrier on which the neighboring cell is located, a PLMN; a tracking area, a maximum uplink transmit power that is allowed; and a cell bar access status indication.

Operation 302: The access network device generates system information of the serving cell, where the system information carries the configuration information of the neighboring cell.

Optionally, the system information includes minimum system information and other system information. The minimum system information carries scheduling information of the other system information; and a target SIB in the other system information carries the configuration information of the neighboring cell.

Optionally, the target SIB includes: at least one SIB of an SIB3, an SIB4, an SIB5, an SIB6, an SIB7, and an SIB8. The configuration information of the neighboring cell may be completely carried in a same SIB for transmission, or may be separately carried in different SIBs for transmission.

Operation 303: The access network device sends the system information of the serving cell to the terminal.

The access network device sends the system information of the serving cell to the terminal.

Optionally, the access network device sends an SSB of the serving cell to the terminal. The SSB includes a PSS, an SSS, and a PBCH.

Figure 4:
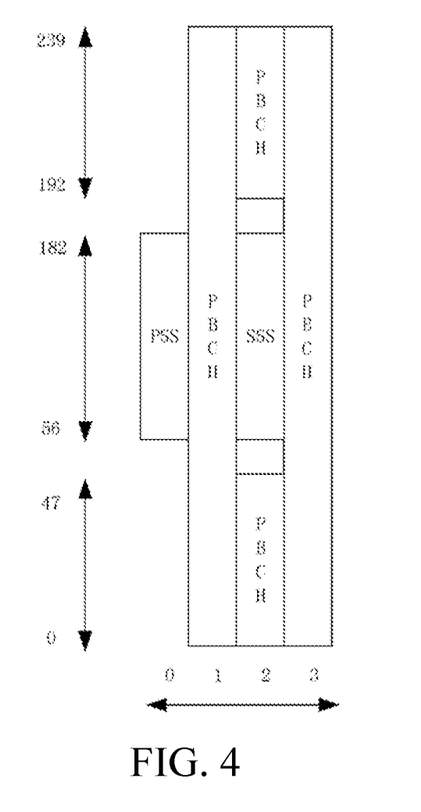
FIG. 4 is a structural diagram of a time domain of an SSB according to another schematic embodiment of this application.

For example, referring to FIG. 4, a possible time domain structure of the SSB is shown.

In the time domain, one SSB includes 4 orthogonal frequency-division multiplexing (OFDM) symbols. The symbols are numbered from 0 to 3 in an ascending order in the SSB. As shown in FIG. 4, the PSS, the SSS, the PBCH, and a demodulation reference signal (DM-RS) of the PBCH occupy different symbols. The DM-RS is not directly shown in FIG. 4.

In the frequency domain, one SSB includes 240 consecutive subcarriers. The subcarriers are numbered from 0 to 239 in an ascending order in the SSB. If k and l are used to represent a frequency domain index and a time domain index in the SSB respectively. A subcarrier 0 of the SSB corresponds to a subcarrier $k_0$ of a common resource block $N_{CRB}^{SSB}$, where $N_{CRB}^{SSB}$ is obtained by using a high layer parameter offset-ref-low-scs-ref-PRB.

Any common resource block that partially or completely overlaps with the SSB should be considered as occupied, and is not used for PDSCH or PDCCH transmission. A UE may assume a resource element that is not used for SS/PBCH transmission, and a part of a partially overlapping common resource is set to zero.

For the SSB, it should be assumed that:

antenna port p=4000, the PSS, the SSS, and the PBCH have a same CP length and a same subcarrier spacing, for an SSB type A, $k_0 \in \{0, 1, 2 \ldots, 23\} k_0 \in \{0, 1, 2 \ldots, 23\}$, $k_0 \in \{0, 1, 2 \ldots, 23\} k_0 \in \{0, 1, 2 \ldots, 23\}$, and $N_{CRB}^{SSB}$ is a representation for a subcarrier spacing of 15 kHz, and for an SSB type B, $k_0 \in \{0, 1, 2 \ldots, 11\} k_0 \in \{0, 1, 2 \ldots, 11\}$, $\mu \in \{3,4\} \mu \in \{3,4\}$, and $N_{CRB}^{SSB}$ is a representation for a subcarrier spacing of 60 kHz.

The access network device further sends the minimum system information to the terminal by using a physical downlink control channel (PDCCH); and the access network device further sends the other system information to the terminal by using a physical downlink shared channel (PDSCH).

Optionally, the access network device sends first scheduling information of the minimum system information in the PBCH channel; and the access network device sends second scheduling information of the other system information in the minimum system information.

The other system information includes a target SIB. The target SIB carries the configuration information of the neighboring cell.

Operation 304: The terminal receives the system information of the serving cell.

The serving cell is a cell on which the terminal camps currently. The terminal receives the system information of the serving cell on which the terminal camps currently.

Optionally, this operation includes the following suboperations:

304a: Determine the first scheduling information of the minimum system information by using the PBCH of the serving cell.

In a process of accessing the serving cell, the terminal already accomplishes uplink/downlink synchronization with the serving cell by using the PSS and the SSS. After downlink synchronization, the terminal receives the PBCH of the serving cell according to a timeslot structure shown in FIG. 4, to obtain the first scheduling information of the minimum system from the PBCH.

304b: Receive the minimum system information according to the first scheduling information.

Optionally, the minimum system information is carried in the PDCCH. The terminal receives the minimum system information in the PDCCH according to the first scheduling information.

304c: Determine the second scheduling information of the other system information based on the minimum system information.

Optionally, the minimum system information carries the second scheduling information of the other system information. The other system information includes a plurality of SIBs. Sending positions and sending periods of each of the SIBs may be the same or different.

One or more target SIBs exist in the plurality of SIBs. The target SIB carries the configuration information of the neighboring cell.

304d: Receive the target SIB according to the second scheduling information.

Optionally, the terminal receives the target SIB according to the second scheduling information of the other system information. In other words, the terminal does not need to receive all SIBs in the other system information, and only needs to selectively receive a part of the SIBs according to an actual requirement. The part of SIBs includes the target SIB.

Optionally, the terminal receives the target SIB in the PDSCH according to the second scheduling information.

Operation 305: The terminal obtains the configuration information of the neighboring cell from the system information.

The terminal obtains the configuration information of the neighboring cell from the target SIB.

Optionally, the configuration information of the neighboring cell includes at least one of the following information:

SSB configuration information of a wideband carrier on which the neighboring cell is located; optionally, the SSB configuration information includes at least one of a frequency location, a PCI, and an ECGI;

a PLMN;

a tracking area (TA);

a maximum uplink transmit power $P_{max}$ that is allowed; and a cell bar access status indication.

Operation 306: The terminal determines whether the neighboring cell is a suitable candidate neighboring cell according to the configuration information of the neighboring cell and the signal quality of the neighboring cell.

Due to a different capability of each terminal and different access parameters and services provided by different cells, the neighboring cell is not necessarily a suitable cell that can be accessed and used by the current terminal.

Optionally, the terminal determines whether the neighboring cell is a suitable candidate neighboring cell according to the configuration information of the neighboring cell and the signal quality of the neighboring cell.

Optionally, the signal quality of the neighboring cell is obtained through measurement on a reference signal of the neighboring cell performed by the terminal. In a possible implementation, signal quality is represented by using reference signal received power (RSRP).

Optionally, the terminal determines whether the neighboring cell meets a first condition according to the configuration information of the neighboring cell, determines whether the neighboring cell meets a second condition according to signal quality of the neighboring cell, determines that the neighboring cell is a suitable candidate neighboring cell when the neighboring cell meets both the first condition and the second condition, and determines that the neighboring cell is not a suitable candidate neighboring cell when the neighboring cell does not meet either of the first condition and the second condition. An order in which the terminal determines whether the first condition and the second condition are met is not limited in this embodiment of this application.

Optionally, the second condition is a criterion S during cell reselection.

When at least one piece of information of the frequency location, a cell type, the PLMN, and the TA of the neighboring cell meets a preset candidate condition, and the signal quality of the neighboring cell meets the criterion S during cell reselection, the terminal determines that the neighboring cell is a suitable candidate neighboring cell.

Operation 307: When the neighboring cell is a suitable candidate neighboring cell, the terminal performs the cell reselection according to signal quality of the serving cell and the signal quality of the neighboring cell.

Optionally, the signal quality of the serving cell is obtained through measurement on a reference signal of the serving cell performed by the terminal, and the signal quality of the neighboring cell is obtained through measurement on a reference signal of the neighboring cell performed by the terminal. In a possible implementation, signal quality is represented by using RSRP.

When the neighboring cell is a suitable candidate neighboring cell, the terminal performs the cell reselection according to the signal quality of the serving cell and the signal quality of the neighboring cell.

Optionally, when the neighboring cell is a suitable candidate neighboring cell, the terminal further performs the cell reselection according to reselection priorities and the signal quality of the serving cell and the neighboring cell.

Optionally, the reselection priorities are configured by the access network device in advance. The access network device may set a corresponding reselection priority for each neighboring cell according to factors such as whether the serving cell and the neighboring cell are intra-frequency cells, or whether the serving cell and the neighboring cell are inter-frequency cells. A setting manner for reselection priorities is not limited in this embodiment.

Operation 308: Ignore the neighboring cell when the neighboring cell is not a suitable candidate neighboring cell.

Optionally, the terminal may ignore the neighboring cell when the neighboring cell is not a suitable candidate neighboring cell.

In conclusion, in the cell reselection method provided in this embodiment, a terminal directly obtains configuration information of a neighboring cell based on system information of a serving cell on which the terminal camps, and performs the cell reselection according to the configuration information of the neighboring cell. The terminal may directly obtain the configuration information of the neighboring cell from the system information of the serving cell without listening to system information of the neighboring cell, or the terminal listens to less system information of the neighboring cell, thereby saving computing resources and power consumption of the terminal.

In an optional technical solution provided based on the foregoing operation 306, the configuration information of the neighboring cell includes all SSB configuration information of the wideband carrier on which the neighboring cell is located. When the terminal determines whether the neighboring cell meets the first condition according to the configuration information of the neighboring cell, at least one of the following operations may be included:

The terminal obtains frequency configuration of the neighboring cell according to the SSB configuration information of the wideband carrier on which the neighboring cell is located; determines, according to the frequency configuration, whether a frequency of the neighboring cell is supported; determines that the neighboring cell is a suitable candidate neighboring cell or continues to determine whether the neighboring cell is a suitable candidate neighboring cell with reference to other configuration information, if the frequency of the neighboring cell is supported; and determines that the neighboring cell is not a suitable candidate neighboring cell if the frequency of the neighboring cell is not supported.

The terminal obtains a cell identifier of the neighboring cell according to the SSB configuration information of the wideband carrier on which the neighboring cell is located; determines, according to the cell identifier of the neighboring cell, that the neighboring cell is a barred cell; determines that the neighboring cell is a suitable candidate neighboring cell or continues to determine whether the neighboring cell is a suitable candidate neighboring cell with reference to other configuration information, if the neighboring cell is not a barred cell; and determines that the neighboring cell is not a suitable candidate neighboring cell if the neighboring cell is a barred cell.

It should be noted that the foregoing process of using the SSB configuration information is merely an example for description, and how the terminal determines whether the neighboring cell meets the first condition according to the SSB configuration information of the neighboring cell is not limited in this embodiment of this application.

In an optional technical solution provided based on the foregoing operation 306, the configuration information of the neighboring cell includes the PLMN. When the terminal determines whether the neighboring cell meets the first condition according to the configuration information of the neighboring cell, at least one of the following operations may be included:

The terminal determines whether the PLMN of the neighboring cell is a PLMN registered in a previous startup or before separation from the cell; determines that the neighboring cell is a suitable candidate neighboring cell or continues to determine whether the neighboring cell is a suitable candidate neighboring cell with reference to other configuration information, if the PLMN of the neighboring cell is a PLMN registered in a previous startup or before separation from the cell; and continues to determine whether the neighboring cell is a suitable candidate neighboring cell with reference to other configuration information if the PLMN of the neighboring cell is not a PLMN registered in a previous startup or before separation from the cell.

The terminal determines whether the PLMN of the neighboring cell belongs to a home PLMN (HPLMN) or an equivalent home PLMN (EHPLMN); determines that the neighboring cell is a suitable candidate neighboring cell or continues to determine whether the neighboring cell is a suitable candidate neighboring cell with reference to other configuration information, if the PLMN of the neighboring cell belongs to an HPLMN or an EHPLMN; and determines that the neighboring cell is not a suitable candidate neighboring cell or continues to determine whether the neighboring cell is a suitable candidate neighboring cell with reference to other configuration information, if the PLMN of the neighboring cell does not belong to an HPLMN or an EHPLMN.

The terminal determines whether the PLMN of the neighboring cell belongs to a home PLMN (HPLMN) or an equivalent home PLMN (EHPLMN); determines that the neighboring cell is a suitable candidate neighboring cell or continues to determine whether the neighboring cell is a suitable candidate neighboring cell with reference to other configuration information, if the PLMN of the neighboring cell belongs to an HPLMN or an EHPLMN; and determines that the neighboring cell is not a suitable candidate neighboring cell or continues to determine whether the neighboring cell is a suitable candidate neighboring cell with reference to other configuration information if the PLMN of the neighboring cell does not belong to an HPLMN or an EHPLMN.

The terminal determines whether the PLMN of the neighboring cell does not belong to a forbidden PLMN (FLMN); determines that the neighboring cell is a suitable candidate neighboring cell or continues to determine whether the neighboring cell is a suitable candidate neighboring cell with reference to other configuration information, if the PLMN of the neighboring cell does not belong to an FPLMN; and determines that the neighboring cell is not a suitable candidate neighboring cell if the PLMN of the neighboring cell belongs to an FPLMN.

The terminal determines whether the PLMN of the neighboring cell does not belong to a forbidden PLMN (FLMN); determines that the neighboring cell is a suitable candidate neighboring cell or continues to determine whether the neighboring cell is a suitable candidate neighboring cell with reference to other configuration information, if the PLMN of the neighboring cell does not belong to an FPLMN; and determines that the neighboring cell is not a suitable candidate neighboring cell if the PLMN of the neighboring cell belongs to an FPLMN.

The terminal determines whether a priority of the PLMN of the neighboring cell meets a preset condition according to a preset priority order; determines that the neighboring cell is a suitable candidate neighboring cell if the priority of the PLMN of the neighboring cell meets the preset condition; and determines that the neighboring cell is not a suitable candidate neighboring cell if the priority of the PLMN of the neighboring cell does not meet the preset condition. The preset priority order may be a user controlled PLMN (UPLMN) priority or an operator controlled PLMN priority.

It should be noted that the foregoing PLMN selection policy is merely an example for description, and how the terminal determines whether the neighboring cell meets the first condition according to the PLMN of the neighboring cell is not limited in this embodiment of this application.

In an optional technical solution provided based on the foregoing operation 306, the configuration information of the neighboring cell includes the TA. When the terminal determines whether the neighboring cell meets the first condition according to the configuration information of the neighboring cell, at least one of the following operations may be included:

The terminal determines whether the TA of the neighboring cell does not belong to a forbidden TA; determines that the neighboring cell is a suitable candidate neighboring cell or continues to determine whether the neighboring cell is a suitable candidate neighboring cell with reference to other configuration information, if the TA of the neighboring cell does not belong to a forbidden TA; and determines that the neighboring cell is not a suitable candidate neighboring cell if the TA of the neighboring cell belongs to a forbidden TA.

The terminal determines whether the TA of the neighboring cell and a TA of the serving cell belong to a same TA list; determines that the neighboring cell is a suitable candidate neighboring cell or continues to determine whether the neighboring cell is a suitable candidate neighboring cell with reference to other configuration information, if the TA of the neighboring cell and the TA of the serving cell belong to a same TA list; and determines that the neighboring cell is not a suitable candidate neighboring cell if the TA of the neighboring cell and the TA of the serving cell do not belong to a same TA list.

It should be noted that the foregoing TA selection policy is merely an example for description, and how the terminal determines whether the neighboring cell meets the first condition according to the TA of the neighboring cell is not limited in this embodiment of this application.

In an optional technical solution provided based on the foregoing operation 306, the configuration information of the neighboring cell includes the maximum uplink transmit power $P_{max}$ that is allowed. When the terminal determines whether the neighboring cell meets the first condition according to the configuration information of the neighboring cell, the following operation may be included:

The terminal determines whether an actual maximum uplink transmit power $P_{umax}$ of the terminal and the maximum uplink transmit power allowed by the neighboring cell meet a preset condition; determines that the neighboring cell is a suitable candidate neighboring cell if the preset condition is met; and determines that the neighboring cell is not a suitable candidate neighboring cell if the preset condition is not met. Optionally, the preset condition is a condition that is determined based on the criterion S related to cell selection/cell reselection.

It should be noted that the foregoing $P_{max}$ selection policy is merely an example for description, and how the terminal determines whether the neighboring cell meets the first condition according to $P_{max}$ of the neighboring cell is not limited in this embodiment of this application.

In an optional technical solution provided based on the foregoing operation 306, the configuration information of the neighboring cell includes the cell bar access status indication. When the terminal determines whether the neighboring cell meets the first condition according to the configuration information of the neighboring cell, the following operation may be included:

The terminal determines whether the cell bar access status indication of the neighboring cell is in a barred state; determines that the neighboring cell is a suitable candidate neighboring cell or continues to determine whether the neighboring cell is a suitable candidate neighboring cell with reference to other configuration information, if the cell bar access status indication of the neighboring cell is not in a barred state; and determines that the neighboring cell is not a suitable candidate neighboring cell if the cell bar access status indication of the neighboring cell is in a barred state.

It should be noted that the foregoing selection policy for the cell bar access status indication is merely an example for description, and how the terminal determines whether the neighboring cell meets the first condition according to the cell bar access status indication of the neighboring cell is not limited in this embodiment of this application.

It should be further noted that the terminal may determine whether the neighboring cell meets the first condition based on based on at least two types of information in the configuration information of the neighboring cell. This can be readily figured out by a person skilled in the art with reference to the content disclosed above, and details are not described herein again.

The following is an apparatus embodiment of this application. The apparatus embodiment is in a one-to-one correspondence with the method embodiment. For details not specifically described in the apparatus embodiment, refer to the foregoing method embodiment.

Figure 5:
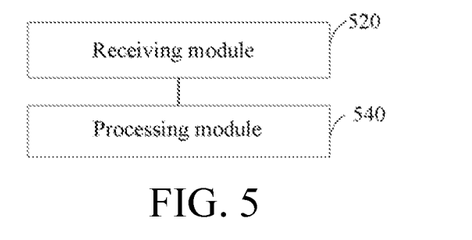
FIG. 5 is a block diagram of a cell reselection apparatus according to a schematic embodiment of this application.

FIG. 5 is a block diagram of a cell reselection apparatus according to an exemplary embodiment of this application. The apparatus may be implemented as all or a part of a terminal through software, hardware, or a combination of the two. The apparatus includes:

a receiving module 520, configured to receive system information of a serving cell;

a processing module 540, configured to obtain configuration information of a neighboring cell from the system information, where the configuration information includes information related to cell reselection, where the processing module 540 is configured to perform the cell reselection according to the configuration information of the neighboring cell, signal quality of the serving cell, and signal quality of the neighboring cell.

In an optional embodiment, the configuration information of the neighboring cell includes at least one of the following information:

synchronization signal block configuration information of a wideband carrier on which the neighboring cell is located;

a public land mobile network list;

a tracking area;

a maximum uplink transmit power that is allowed; and a cell bar access status indication.

In an optional embodiment, the synchronization signal block configuration information includes: at least one of a frequency location, a physical cell identifier, and a cell global identity code.

In an optional embodiment, the processing module 540 is configured to determine first scheduling information of minimum system information based on a physical broadcast channel of the serving cell; the processing module 540 is configured to receive the minimum system information according to the first scheduling information; the processing module 540 is configured to determine second scheduling information of other system information based on the minimum system information; and the processing module 540 is configured to receive a target system information block according to the second scheduling information, where the target system information block carries the configuration information of the neighboring cell.

In an optional embodiment, the target system information block includes: at least one of a system information block 3, a system information block 4, a system information block 5, a system information block 6, a system information block 7, and a system information block 8.

In an optional embodiment, the processing module 540 is configured to determine whether the neighboring cell is a suitable candidate neighboring cell according to the configuration information of the neighboring cell and the signal quality of the neighboring cell; and the processing module 540 is configured to perform the cell reselection according to the signal quality of the serving cell and the signal quality of the neighboring cell when the neighboring cell is a suitable candidate neighboring cell.

Figure 6:
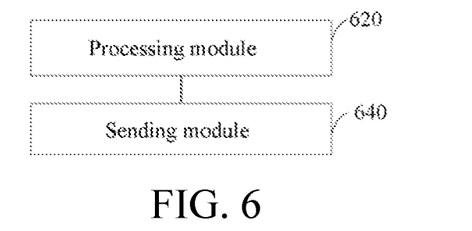
FIG. 6 is a block diagram of a cell reselection apparatus according to another schematic embodiment of this application.

FIG. 6 is a block diagram of a cell reselection apparatus according to an exemplary embodiment of this application. The apparatus may be implemented as all or a part of a terminal through software, hardware, or a combination of the two. The apparatus includes:

a processing module 620, configured to obtain configuration information of a neighboring cell of a serving cell, where the configuration information includes information related to cell reselection, where the processing module 620 is configured to generate system information of the serving cell, and the system information carries the configuration information of the neighboring cell; and a sending module 640, configured to send the system information of the serving cell to a terminal, where the terminal is a terminal camping on the serving cell, and the configuration information is used by the terminal for cell reselection.

In an optional embodiment, the configuration information of the neighboring cell includes at least one of the following information:

synchronization signal block configuration information of a wideband carrier on which the neighboring cell is located;

a public land mobile network list;

a tracking area;

a maximum uplink transmit power that is allowed; and a cell bar access status indication.

In an optional embodiment, the synchronization signal block configuration information includes: at least one of a frequency location, a physical cell identifier, and a cell global identity code.

In an optional embodiment, the system information includes: minimum system information and other system information.

The minimum system information carries scheduling information of the other system information.

A target system information block in the other system information carries the configuration information of the neighboring cell.

In an optional embodiment, the target system information block includes: at least one of a system information block 3, a system information block 4, a system information block 5, a system information block 6, a system information block 7, and a system information block 8.

Figure 7:
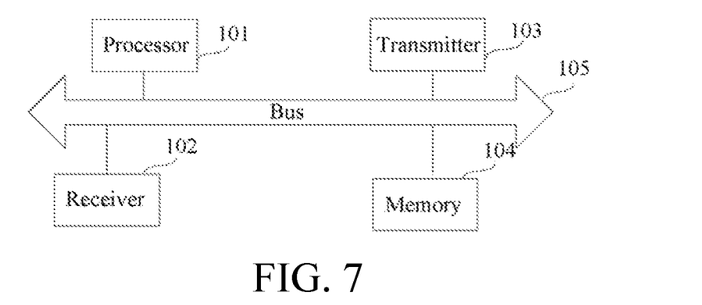
FIG. 7 is a structural block diagram of a terminal according to another schematic embodiment of this application.

FIG. 7 is a schematic structural diagram of a terminal according to an exemplary embodiment of this application. The terminal includes: a processor 101, a receiver 102, a transmitter 103, a memory 104, and a bus 105.

The processor 101 includes one or more processing cores. The processor 101 runs a software program and a module to execute various functional applications and perform information processing.

The receiver 102 and the transmitter 103 may be implemented as one communications component. The communications component may be a communications chip.

The memory 104 is connected to the processor 101 by using the bus 105.

The memory 104 may be configured to store at least one instruction. The processor 101 is configured to perform the at least one instruction, to implement the operations performed by the terminal in the foregoing method embodiments.

In addition, the memory 104 may be implemented by a volatile or non-volatile storage device of any type or a combination thereof. The volatile or non-volatile storage device includes but is not limited to: a magnetic disk or an optical disc, an electrically erasable programmable read-only memory (EEPROM), an erasable programmable read only memory (EPROM), a static random access memory (SRAM), a read-only memory (ROM), a magnetic memory, a flash memory, or a programmable read-only memory (PROM).

Figure 8:
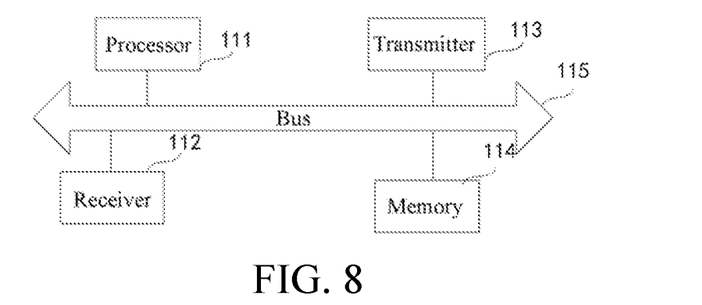
FIG. 8 is a structural block diagram of an access network device according to another schematic embodiment of this application.

FIG. 8 is a schematic structural diagram of an access network device according to an exemplary embodiment of this application. The access network device includes: a processor 111, a receiver 112, a transmitter 113, a memory 114, and a bus 115.

The processor 111 includes one or more processing cores. The processor 111 runs a software program and a module to execute various functional applications and perform information processing.

The receiver 112 and the transmitter 113 may be implemented as a communications component. The communications component may be a communications chip.

The memory 114 is connected to the processor 111 by using the bus 115.

The memory 114 may be configured to store at least one instruction. The processor 111 is configured to perform the at least one instruction, to implement the operations performed by the access network device in the foregoing method embodiments.

In addition, the memory 114 may be implemented by a volatile or non-volatile storage device of any type or a combination thereof. The volatile or non-volatile storage device includes but is not limited to: a magnetic disk or an optical disc, an electrically erasable programmable read-only memory (EEPROM), an erasable programmable read only memory (EPROM), a static random access memory (SRAM), a read-only memory (ROM), a magnetic memory, a flash memory, or a programmable read-only memory (PROM).

This application provides a computer readable storage medium. The storage medium stores at least one instruction, and the at least one instruction is loaded and executed by the processor to implement the cell reselection method and/or the system information sending method according to the forgoing method embodiments.

This application further provides a computer program product. When the computer program product runs on a computer, the computer is enabled to perform the cell reselection method and/or the system information sending method according to the forgoing method embodiments.

A person skilled in the art should be aware that in the foregoing one or more examples, functions described in this application may be implemented by hardware, software, firmware, or any combination thereof. When the present invention is implemented by software, the foregoing functions may be stored in a computer readable medium or transmitted as one or more instructions or code in the computer readable medium. The computer-readable medium includes a computer storage medium and a communications medium. The communications medium includes any medium that facilitates a computer program to be transmitted from one place to another. The storage medium may be any available medium accessible to a general-purpose or special-purpose computer.

The foregoing descriptions are merely preferred embodiments of this application, but are not intended to limit this application. Any modification, equivalent replacement, or improvement made without departing from the spirit and principle of this application should fall within the protection scope of this application.

The invention claimed is:

1. A cell reselection method, comprising:
   receiving, by a terminal, system information of a serving cell;
   obtaining, by the terminal, configuration information of a neighboring cell from the system information, wherein the configuration information comprises information related to cell reselection, and wherein the configuration information of the neighboring cell comprises at least one of: a public land mobile network list, a tracking area, a maximum uplink transmit power that is allowed, or a cell bar access status indication; and
   performing, by the terminal, the cell reselection according to signal quality of the serving cell and signal quality of the neighboring cell, in response to a determination that the neighboring cell is a suitable candidate neighboring cell according to the configuration information of the neighboring cell and the signal quality of the neighboring cell;
   wherein the system information comprises minimum system information and other system information;
   wherein the minimum system information carries scheduling information of the other system information; and
   wherein a target system information block in the other system information carries the configuration information of the neighboring cell.

2. The method according to claim 1, wherein the synchronization signal block configuration information comprises at least one of a frequency location, a physical cell identifier, and a cell global identity code.

3. The method according to claim 1, wherein the receiving, by a terminal, system information of a serving cell comprises:
   determining, by the terminal, first scheduling information of the minimum system information by using a physical broadcast channel of the serving cell;
   receiving, by the terminal, the minimum system information according to the first scheduling information;
   determining, by the terminal, second scheduling information of the other system information based on the minimum system information; and
   receiving, by the terminal, the target system information block according to the second scheduling information.

4. The method according to claim 3, wherein the target system information block comprises: at least one of a system information block 3, a system information block 4, a system information block 5, a system information block 6, a system information block 7, and a system information block 8.

5. The method according to claim 1, wherein
   the neighboring cell is the suitable candidate neighboring cell when the neighboring cell meets a public land mobile network (PLMN) condition; and
   the neighboring cell is the suitable candidate neighboring cell when the neighboring cell meets a criterion S condition.

6. The method according to claim 1, wherein the serving cell is a cell on which the terminal currently camps, and the receiving, by a terminal, system information of a serving cell comprises:
   receiving, by the terminal, the system information of the serving cell on which the terminal currently camps.

7. A system information sending method, comprising:
   obtaining, by an access network device, configuration information of a neighboring cell of a serving cell, wherein the configuration information comprises information related to cell reselection, and wherein the configuration information of the neighboring cell comprises at least one of: a public land mobile network list, a tracking area, a maximum uplink transmit power that is allowed, or a cell bar access status indication;
   generating, by the access network device, system information of the serving cell, wherein the system information carries the configuration information of the neighboring cell; and
   sending, by the access network device, the system information of the serving cell to a terminal to enable a terminal to perform the cell reselection according to signal quality of the serving cell and signal quality of the neighboring cell in response to a determination that the neighboring cell is a suitable candidate neighboring cell according to the configuration information of the neighboring cell and the signal quality of the neighboring cell, wherein the terminal is a terminal camping on the serving cell, and the configuration information is used by the terminal for the cell reselection;

wherein the system information comprises: minimum system information and other system information;

wherein the minimum system information carries scheduling information of the other system information; and wherein a target system information block in the other system information carries the configuration information of the neighboring cell.

8. The method according to claim 7, wherein the synchronization signal block configuration information comprises at least one of a frequency location, a physical cell identifier and a cell global identity code.

9. The method according to claim 7, wherein the target system information block comprises: at least one of a system information block 3, a system information block 4, a system information block 5, a system information block 6, a system information block 7, and a system information block 8.

10. The method according to claim 7, wherein the serving cell is a cell on which the terminal currently camps.

11. A cell reselection apparatus, comprising:
a receiver, configured to receive system information of a serving cell; and
a processor, configured to obtain configuration information of a neighboring cell from the system information, wherein the configuration information comprises information related to cell reselection, wherein the configuration information of the neighboring cell comprises at least one of: a public land mobile network list, a tracking area, a maximum uplink transmit power that is allowed, or a cell bar access status indication, and wherein
the processor is configured to perform the cell reselection according to signal quality of the serving cell and signal quality of the neighboring cell, in response to a determination that the neighboring cell is a suitable candidate neighboring cell according to the configuration information of the neighboring cell and the signal quality of the neighboring cell;

wherein the system information comprises: minimum system information and other system information;

wherein the minimum system information carries scheduling information of the other system information; and wherein a target system information block in the other system information carries the configuration information of the neighboring cell.

12. The apparatus according to claim 11, wherein the synchronization signal block configuration information comprises at least one of a frequency location, a physical cell identifier, and a cell global identity code.

13. The apparatus according to claim 11, wherein
the processor is configured to determine first scheduling information of the minimum system information by using a physical broadcast channel of the serving cell;
the receiver is configured to receive the minimum system information according to the first scheduling information;
the processor is configured to determine second scheduling information of the other system information based on the minimum system information; and
the receiver is configured to receive the target system information block according to the second scheduling information.

14. The apparatus according to claim 13, wherein the target system information block comprises: at least one of a system information block 3, a system information block 4, a system information block 5, a system information block 6, a system information block 7, and a system information block 8.

15. The apparatus according to claim 11, wherein
the processor is configured to determine that the neighboring cell is the suitable candidate neighboring cell when the neighboring cell meets a public land mobile network (PLMN) condition; and
the processor is configured to determine that the neighboring cell is the suitable candidate neighboring cell when the neighboring cell meets a criterion S condition.

16. A non-transitory computer readable storage medium having stored therein instructions that when executed by a processor of a terminal, implement cell reselection method, the method comprising:
receiving, by a terminal, system information of a serving cell;
obtaining, by the terminal, configuration information of a neighboring cell from the system information, wherein the configuration information comprises information related to cell reselection, and wherein the configuration information of the neighboring cell comprises at least one of: a public land mobile network list, a tracking area, a maximum uplink transmit power that is allowed, or a cell bar access status indication; and
performing, by the terminal, the cell reselection according to signal quality of the serving cell and signal quality of the neighboring cell, in response to a determination that the neighboring cell is a candidate neighboring cell according to the configuration information of the neighboring cell and the signal quality of the neighboring cell;

wherein the system information comprises: minimum system information and other system information;

wherein the minimum system information carries scheduling information of the other system information; and wherein a target system information block in the other system information carries the configuration information of the neighboring cell.

* * * * *